Aug. 4, 1964 SHIH CHIEH CHAO 3,143,726

MAGNETIC COUNTER

Filed Nov. 12, 1957

INVENTOR.

SHIH CHIEH CHAO

BY

Edward A. Robinson

ATTORNEY 3,143,726
Patented Aug. 4, 1964

3,143,726
MAGNETIC COUNTER

Shih Chieh Chao, Palo Alto, Calif., assignor to International Business Machines Corporation, New York, N.Y., a corporation of New York Filed Nov. 12, 1957, Ser. No. 695,569
1 Claim. (Cl. 340—174)

This invention relates to counters and shifting registers which may be useful in computer circuits, and more particularly this invention relates to a ferrite core structure having a plurality of legs of flux paths and capable of storing digital information by retaining magnetic flux of a selected polarity in the particular flux paths.

In a digital computer, counting is that process which records the number of pulse type signals that may occur in succession. The pulse type signals may in themselves be binary in nature although the system for counting them may employ any base or radix such as 10 for a decimal system. Counting devices generally consist of a set of bistable storage elements, each of which transfers back and forth between two stable states upon the reception of pulses. The pulses to be counted are applied to one of the bistable elements, and each time this element changes from a state representing one to a state representing zero, a pulse is sent to a second element in the set. When the second element transfers to zero, a pulse is sent to the third element, and this process continues in a similar manner for all the bistable elements of the set. With the decimal system, elements having 10 stable states are used, and each time a given element changes from the state representing 9 to the state representing zero, an output pulse is generated and may be sent to the next element.

Binary multiplication is commonly performed in a computer circuit with the use of a shifting register or shifting accumulator. In performing a binary multiplication, the multiplicand is entered into the shifting register as a partial product when multiplied by a one appearing in the multiplier. With each partial product the multiplicand must be shifted relative to the accumulated sum of each addition. The shifting operation consists of entering a zero as the highest order digit while moving all of the remaining digits to the right or to one less order.

It is an object of this invention to provide an improved counter which will include a single magnetic core structure with multiple core legs which form multiple flux paths each capable of retaining a bit of information by retaining a magnetic flux having a polarity representative of the information bit. As input pulses are received, the magnetic flux polarity in the various paths may be reversed sequentially until the flux in a final path is reversed and sensed to provide an output signal.

It is another object of this invention to provide a shifting register which may receive a digital number and which may thence shift the digital number by adding either a zero or a one to the highest order thereof while simultaneously moving each of the other digit indications to an order of one degree less.

Briefly stated, in a preferred embodiment of this invention a magnetic core is formed in a ladder-like configuration with two spaced-apart longitudinal flux paths and with a plurality of rung-like transverse flux paths connecting between the two longitudinal paths. A reset winding may link one end of the ladder-like core for providing a strong magnetomotive force to establish magnetic flux of a first polarity in all of the rung-like paths. A plurality of input windings may link the longitudinal portion of the core between each of the rung-like portions thereof and may be connected together to receive input pulses to be counted. As the input pulses are received, the magnetomotive force generated thereby will sequentially reverse or "flip" the magnetic flux to the second polarity in the rung-like flux paths. An output winding is arranged to link the final rung-like path such that a voltage pulse will be generated when the flux polarity of that final path is reversed. To adapt this core arrangement for use as a shifting register, a second input winding is arranged to link with the core and to assist the first input winding in reversing the polarity of the magnetic flux in the first rung-like path.

Other objects of the invention will be pointed out in the following description and claim and illustrated in the accompanying drawings which disclose, by way of example, the principle of the invention and the best mode which has been contemplated of applying that principle.

Figure 1:
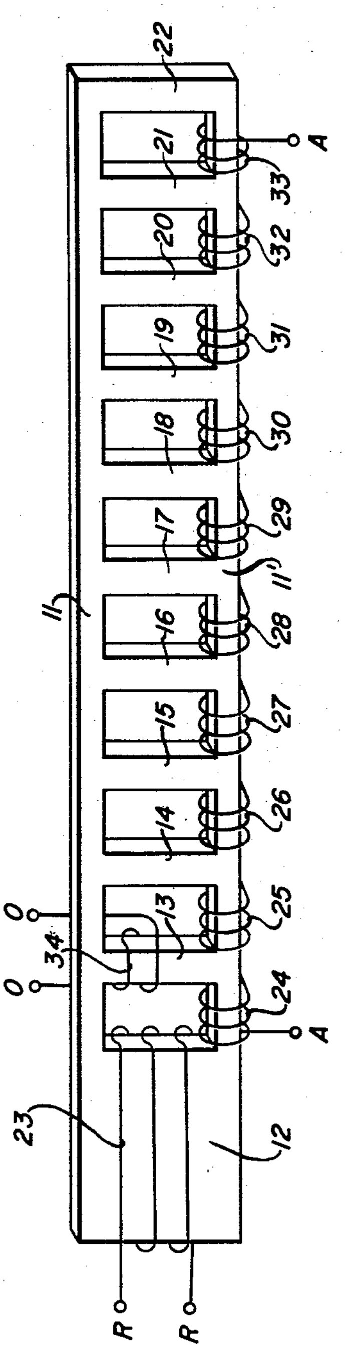
FIG. 1 is a perspective view of the magnetic core of this invention together with a schematic indication of the windings linking therewith to form a first embodiment of this invention.

As shown in both figures, the magnetic core is formed in a ladder-like configuration with two spaced-apart longitudinal flux path core legs 11–11' forming the sides thereof. A flux path core leg 12 connects between the longitudinal paths 11 and 11' at one end of the core structure, and a plurality of rung-like flux path core legs 13 through 22 each connect between the longitudinal paths 11 and 11' and are spaced sequentially from the first flux path 12 to the end remote therefrom. In both of the embodiments of this invention, a reset winding 23 links the first end 12 of the core and may be connected to a suitable current source (not shown) by the terminals R—R.

Figure 2:
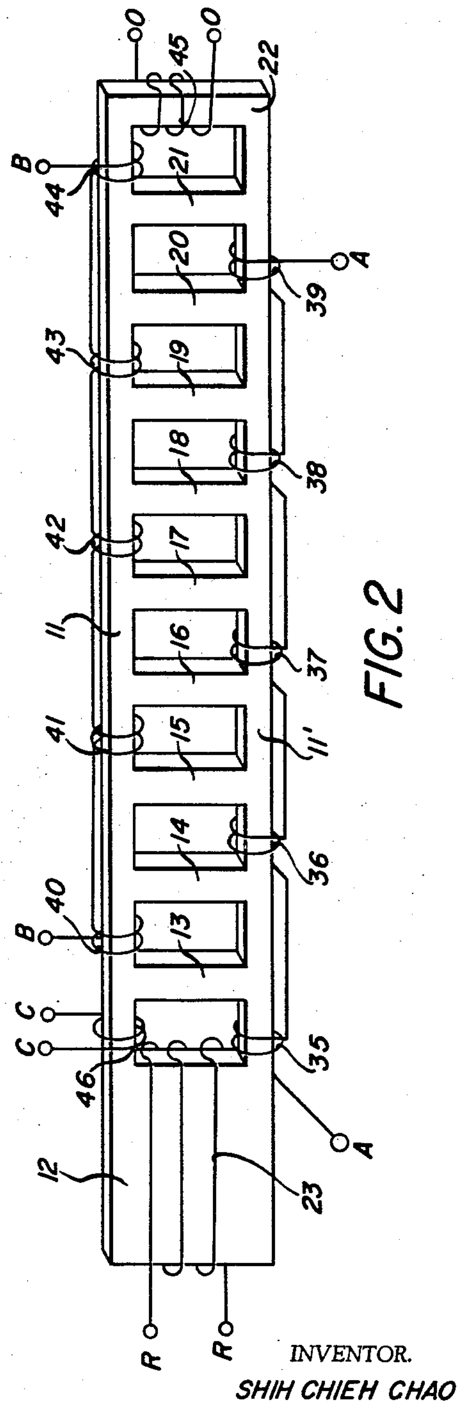
FIG. 2 is a similar perspective view of the magnetic core together with a schematic indication of the windings linking therewith forming a second embodiment of this invention.

It will be understood by those skilled in the art that the core structures shown in both FIGS. 1 and 2 are schematic only, and are intended to illustrate the principles of operation of the invention. It will be appreciated that in order to provide the necessary flux to produce saturation in each of the different legs of the core structure shown in FIGS. 1 and 2, either one of two approaches may be utilized. In general, it will be understood that the total flux will be highest in the central core portion 12 and will decrease progressively in legs 11, 11' as the other end of the core structure is approached. In one approach, the different portions of the core structure may have the same cross sectional area, while the materials utilized in the different legs have different magnetic permeabilities so as to produce the necessary flux distribution. In the other approach, the core may be constructed of a material having uniform magnetic permeability, while the core itself is in the form of a wedge, with the widest part of the wedge in the portion corresponding to leg 12, so that the required flux may exist in the different portions of the core to produce saturation in the rung-like member legs.

A counting cycle may be initiated by passing a heavy current through the reset winding 23 and thereby developing a magnetomotive force to establish a saturating magnetic flux of a first polarity in each of the rung-like flux paths 13 through 22. Assuming that the magnetomotive force generates magnetic flux which may be represented by vectors extending upwardly through the end flux path 12, then a corresponding magnetic flux through each of the rung-like paths would have a vector direction downwardly.

In FIG. 1, a plurality of input windings 24 through 33 are connected in series between a pair of input terminals A—A. Each of the input windings 24 through 33 links with a portion of the longitudinal flux path 11' between each of the transverse flux paths 12 through 22. The terminals A—A may be electrically connected to a source of current pulses to be counted. When the first current pulse is received at the input terminals A—A, a magnetomotive force is generated by each of the input windings 24 through 33. The first of the current pulses and magnetomotive force pulses generated thereby is sufficient to reverse the flux polarity in the rung-like leg 22 most remote from the reset end 12 of the core. The magnetomotive force generated by the input winding 33 is operable to reverse the flux polarity in the leg 22 and at the same time is further operable to maintain the first flux polarity in the rung-like leg 21. When a second pulse is received, the effect of the input winding 33 is reduced since the flux then flowing in the path 22 is of the second polarity and is being merely driven further towards saturation by the winding 33. Since the effect of the winding 33 is reduced upon the reception of the second pulse, the winding 32 will become more effective and will reverse the polarity of the leg 21. Likewise, upon reception of the third pulse to be counted, the windings 32 and 33 both become ineffective since the flux in both of the legs 21 and 22 is now reversed and the magnetomotive force of the two windings 32 and 33 tend to merely drive the flux density further towards saturation. With this condition (third pulse), the input winding 31 becomes effective and reverses the flux in the leg 20. Using this same logic, it may be appreciated that with each successive pulse the next adjacent input winding becomes effective to reverse the flux polarity in the next adjacent rung-like leg.

The counter shown in FIG. 1 is a decade counter having a radix of 10. With such a counter, the tenth input pulse will be operative to reverse the flux in the final rung-like leg which in this case is the path 13, and the flux reversal thus effected will cause a voltage pulse to be generated in the winding 34 linking the path 13 to produce an output voltage at the terminals O—O. Thus, the counting operation is initiated by a strong reset current flowing through the winding 23 to establish a magnetic flux of a first direction through all of the rung-like legs 13 through 22. Thence input pulses are received and are counted by successive reversals of flux in the flux paths commencing with path 22 and progressing to the final path 13 whereupon an output voltage is generated and appears at the terminals O—O to indicate completion of the counting operation.

In FIG. 2, the ladder-like core arrangement is provided with windings to produce a five-bit ring counter or a shifting register. A counting operation is commenced by applying a strong current to a reset winding 23 whereby a saturating magnetic flux of a first polarity is established in each of the rung-like legs 13 through 22. Input windings 35 through 39 are provided which link at least one of the longitudinal flux paths 11' between each alternate pair of ladder-like paths. Thus, the winding 35 links the core between the reset end 12 and the first rung-like path 13, a second winding 36 links the core between the ladder-like paths 14 and 15, and the windings 37, 38 and 39 similarly link alternate windows between the rung-like paths along the length of the core. These windings 35 through 39 are electrically connected in series and form a first input circuit connecting with the terminals A—A. A second input circuit is provided connecting between terminals B—B and includes serially connected input windings 40 through 44. These windings are likewise arranged to link the alternate windows between the rung-like flux paths and are arranged such that they alternate with the windings 35 through 39. Thus, the winding 40 links the magnetic core between the cross-flux paths 13 and 14 and thereby is positioned intermediate between the windings 35 and 36 of the first input circuit. The second input winding 41 of the second circuit is similarly positioned to link the core between another pair of cross-flux paths 15 and 16 and thereby also be positioned intermediate between the windings 36 and 37 of the first circuit. Thus, the windings of the two input circuits are spaced along the core in an alternate fashion such that a first window is linked with the winding of the first circuit, a second window is linked with a winding of the second circuit, a third window is linked with a winding of the first circuit, etc. until a last window is linked with a winding of the second circuit.

After the reset current has passed through winding 23 and a saturating flux of the first direction has been established in all of the rung-like paths 13 through 22, the counting operation may commence with an input pulse being applied to the terminals A—A. Upon receiving the input pulse, the windings 35 through 39 each generate a magnetomotive force tending to reverse the direction of flux in that rung-like leg positioned to the right of each of the input windings (as shown in FIG. 2). With the first input pulse following the reset current, the magnetomotive force generated in winding 35 will cause a reversal in the first rung-like leg 13 immediately adjacent to the reset end 12 of the core. This is accomplished because the magnetomotive force from the winding 35 will reverse the saturating flux in leg 13 via a closed flux loop which includes the reset end 12 of the core. During this first pulse of the A terminals, the winding 36 will be ineffective to reverse the flux in the cross-path 15, since the closed path of magnetic flux encircling the window of the winding 36 will include the flux path 14 which has already been driven to saturation by the reset current, and since the magnetomotive force generated by the winding 36 will tend to drive that flux even further into saturation, this saturation of the leg 14 will prevent the flow of flux and will therefore block the reversal of flux in the leg 15. Similarly, the magnetomotive force generated by winding 37 will fail to reverse the flux in the leg 17 because of the presaturation in the leg 16 blocking further flux therethrough. By the same logic, it follows that the magnetomotive force of the windings 38 and 39 will fail to reverse the flux in the legs 19 and 21, respectively, because of the saturation of the legs 18 and 20. Therefore, it may be appreciated that the first A current pulse following the reset will effect a flux reversal in the rung-like leg 13, but will not effect a flux reversal in any of the other legs.

After a pulse of current has been applied to the terminals A—A, a second pulse is thence applied, but to the input terminals B—B. As a result of the first B pulse, each of the windings 40 through 44 generate a magnetomotive force tending to reverse the flux in the paths 14, 16, 18, 20 and 22. With this first B pulse, the magnetomotive force generated by the winding 40 will effectively reverse the flux in the legs 13 and 14, thus rendering the flux of the leg 13 of the first polarity while that of the leg 14 changes to the second polarity. (The flux of leg 13 having previously beeen reversed from the first to the second polarity by the first A pulse.) The magnetomotive force generated by the winding 41 would tend to reverse the flux in the leg 16, but due to the presaturation of leg 15 tending to block any further flux therein, the reversal of the leg 16 is thereby blocked. Similarly, the magnetomotive forces generated by the windings 42, 43 and 44 will fail to reverse the flux in the paths 18, 20 and 22.

Following the B pulse, a second A pulse will be applied whereupon the magnetomotive force of the winding 35 will again reverse the flux in the path 13 to the second polarity, and the magnetomotive force generated by the winding 36 will likewise reverse the flux in the path 15 to the second polarity while at the same time reversing the flux in the path 14 back again to the first polarity. During the second A pulse, the flux in the magnetomotive force generated by the windings 37, 38 and 39 will be ineffective because of the continued saturation of the legs 16, 18 and 20 in the direction of the magnetomotive force. Thus, it will be appreciated that the second A pulse causes flux reversal in legs 13, 14 and 15 such that the flux in legs 13 and 15 will be of the second polarity while that in leg 14 will be of the first polarity. A second B pulse may then be received whereupon the windings 40 and 41 become effective to reverse the flux in the paths 13 and 14, and 15 and 16, respectively. At the termination of the second B pulse the flux will be of the first polarity in windings 14 and 16 and will be of the second polarity in windings 13 and 15. During the second B pulse the magnetomotive force of windings 42, 43 and 44 will be ineffective because of the blocking effect of the saturated legs 17, 19 and 21, respectively. A third A pulse will cause flux reversals in the legs 13 through 17 such that the flux will be of the second polarity in legs 13, 15 and 17 and will be of the first polarity in legs 14 and 16. With each additional input pulse a further input winding will become effective to reverse the polarity of a further rung-like cross-flux path until at the tenth pulse (the fifth B pulse) the flux will be reversed in a final cross-path 22, whereupon a voltage will be generated in an output winding 45 and will appear at the output terminal O—O.

As was described heretofore, the arrangement of FIG. 2 may be used as a decimal counter for counting pulses which alternately appear on a first set of terminals A—A and then on a second set of terminals B—B. In practice, it has been found that the counter will be more reliable if used as a quinary counter wherein the radix of the number system is 5. In such a counter only the A pulses are actually counted, the B pulses being generated from a constant source at a pulse time intermediate between the times in which A pulses are received. In such a system an initial flux reversal in the various legs is caused by the A pulses to be counted. The alternate B pulses, which will always appear, will then cause flux reversals only when preceded by a pulse at the A terminals. Thus, it will be appreciated that if two or more pulses appeared at the B terminals in succession, the subsequent pulses would have no effect beyond the effect already established by the first pulse, and therefore the A pulses only are counted.

In a further form of this invention, the input winding 35 may have an insufficient number of turns to generate a magnetomotive force required to reverse or flip the polarity of the flux in the rung-like leg 13. A further input winding 46 is provided linking the core between the rung-like leg 13 and the reset end 12. The windings 35 and 46 are so arranged to be active when an input pulse is received at both of the terminals A—A and a pair of terminals C—C electrically connected to the winding 46. With this arrangement, a train of alternate pulses is fed to the terminals A—A and B—B, and the true input pulses are impressed upon the terminals C—C. Thus, the pulses to be counted are passed through the winding 46 at a time coincident with an A pulse passing through the windings 35 through 39 inclusive. The combined magnetomotive force of the winding 35 and the winding 46 will then be sufficient to reverse the flux in the leg 13 from a first polarity to a second polarity. Then a B pulse will pass through the windings 40 through 44 and the magnetomotive force generated by the winding 40 will reverse the flux in the paths 13 and 14 such that the path 13 will have flux of the first polarity and path 14 will have flux of the second polarity. An A pulse will then follow the B pulse and if another input pulse coincides therewith through the winding 46, the flux in the leg 13 will again reverse. However, if no pulse passes through the winding 46, then the flux of the leg 13 will fail to reverse and will remain of the first polarity.

In another form of this invention, the winding 35 may be eliminated entirely and the input winding 46 may produce a sufficient magnetomotive force (ampere turns) to accomplish a flux reversal in the rung-like leg 13 unaided. This form of the invention would be advantageous since the input pulses impressed on terminals C—C would not have to be timed to coincide with the A pulse impressed on terminals A—A.

It may be appreciated from the foregoing that the reversal of the flux in the leg 13 depends upon the presence or absence of a C pulse flowing through the winding 46. Likewise, the flux reversal in the leg 14 depends upon the polarity of flux in the leg 13 during the time of the B pulse. Thus, if the flux has previously been reversed in the leg 13 to the second polarity, then the flux in the leg 14 will likewise be reversed by the next successive B pulse. However, if there has been no reversal of flux in the leg 13 (flux of the first polarity remaining), then there will be no subsequent reversal of flux in the leg 14 during the B pulse. In a similar manner, when the second A pulse is received, the flux in the leg 15 will still reverse providing the flux in leg 14 has previously been reversed during the previous B pulse.

If it is desired to use the structure of FIG. 2 as a shifting register, a binary number may be impressed thereon by a signal introduced at the terminals C—C. This signal contains a series of pulses in time coincidence with the continuing sequency of A pulses and further contains zero voltages (absence of pulses) further coincident with other A pulses. For example, if it is desired to impress a binary number 1100 upon a shifting register of this type, the register is first reset and then during the first two A pulses a pair of C pulses will be present, and during the next two A pulses there will be no voltage thereby indicating a pair of zeros. When the first "1" is received, a flux reversal takes place in the leg 13. This causes a subsequent flux reversal of the legs 13 and 14 during the interval of the B pulses. Next a reversal again occurs during the interval of the A pulses, since a second "1" or pulse voltage will appear at the terminals C—C. This second flux reversal will likewise be transmitted to the leg 14 while the first flux reversal has progressed to the leg 16. During the next two "0" pulses there will be no reversal of the leg 13 and no subsequent reversal of the leg 14. However, during this time the "1's" will have progressed to the legs 20 and 18 which will then be reversed. The binary number can thus be retained in the counter legs 20 and 18, or it may be shifted along toward the output leg at the extreme end by alternate A and B pulses. The number may be read out of the counter or register by continuing the alternate A and B pulses and sensing the voltages induced in the winding 45 linking the final leg 22.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

A counter comprising an elongated magnetic core having a plurality of openings spaced longitudinally of the core to provide flux paths therebetween, said core being capable of retaining a bit of information by retaining a magnetic flux representative of said bit, a reset winding linking the core through a first of the openings for generating magnetic flux of a first polarity in each of the flux paths between the openings, a plurality of input windings each linking said core through a separate opening, means electrically connecting said input windings into two electrically separate circuits, the windings of each circuit linking alternate openings in the core, means for alternately supplying current pulses to said two circuits to generate pulses of magnetomotive force, the pulses of magnetomotive force thereby generated being operable to first reverse the flux polarity in the magnetic flux path adjacent to the reset winding and thence to reverse the flux polarity sequentially in the flux paths more remote from the reset winding, and an output winding linking with a terminal the flux path most remote from the reset winding for sensing the flux polarity reversal therein.

(References on following page)

References Cited in the file of this patent

UNITED STATES PATENTS

| | | |
|---|---|---|
| 2,519,426 | Grant | Aug. 22, 1950 |
| 2,869,112 | Hunter | Jan. 13, 1959 |
| 2,889,542 | Goldner et al. | June 2, 1959 |
| 2,898,581 | Post | Aug. 4, 1959 |
| 2,907,988 | Duinker | Oct. 6, 1959 |
| 2,919,432 | Broadbent | Dec. 29, 1959 |
| 2,923,834 | Silverman | Feb. 2, 1960 |
| 2,951,245 | Kihn | Aug. 30, 1960 |

OTHER REFERENCES

Publication I: "The Transfluxor," by J. A. Rajchman et al., published March 1956, "Proceedings of the IRE," vol. 44, issue 3, pp. 321–332.